United States Patent

Tsuda et al.

[11] Patent Number: 6,038,063
[45] Date of Patent: Mar. 14, 2000

[54] OPTICAL AMPLIFIER AND OPTICAL TRANSMISSION SYSTEM INCLUDING THE OPTICAL AMPLIFIER

[75] Inventors: Takashi Tsuda; Hiroshi Nishimoto; Kazuo Yamane; Yumiko Kawasaki, all of Kawasaki; Satoru Okano, Sapporo, all of Japan

[73] Assignee: Fujitsu Limited, Kawasaki, Japan

[21] Appl. No.: 09/040,372

[22] Filed: Mar. 18, 1998

[30] Foreign Application Priority Data

Oct. 16, 1997 [JP] Japan .................................. 9-283996

[51] Int. Cl.⁷ ...................................................... H01S 3/00
[52] U.S. Cl. .......................................... 359/341; 359/124
[58] Field of Search ................................. 359/341, 134, 359/124

[56] References Cited

U.S. PATENT DOCUMENTS 5,664,131  9/1997  Sugiya ..................................... 359/341
5,673,142  9/1997  Fatehi et al. ............................ 359/341

OTHER PUBLICATIONS

U.S. application No. 08/845,847, filed Apr. 28, 1997, Fujitsu Limited.

*Primary Examiner*—Mark Hellner
*Attorney, Agent, or Firm*—Staas & Halsey

[57] ABSTRACT

An optical amplifier relates to WDM (wavelength division multiplexing). The optical amplifier includes an optical amplifying unit, an ALC (automatic output level control) circuit for controlling the unit based on the output level thereof, and AGC (automatic gain control) circuit for controlling the unit based on the input and output levels thereof. A selecting circuit alternatively selects and operates the ALC and AGC circuits in accordance with a predetermined rule. Accordingly, the inconvenience occurring in the case of performing only one of ALC and AGC can be eliminated.

49 Claims, 16 Drawing Sheets

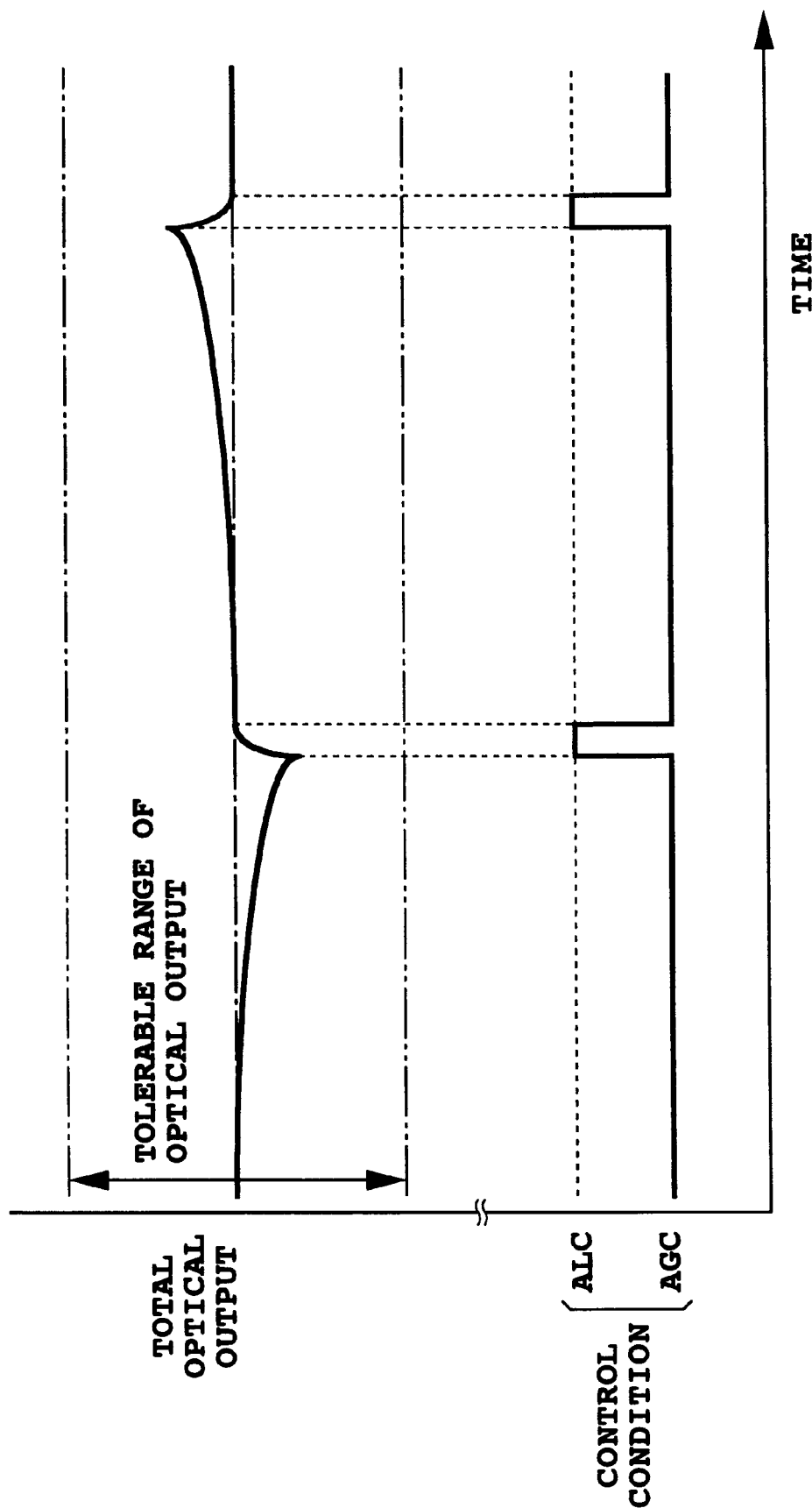

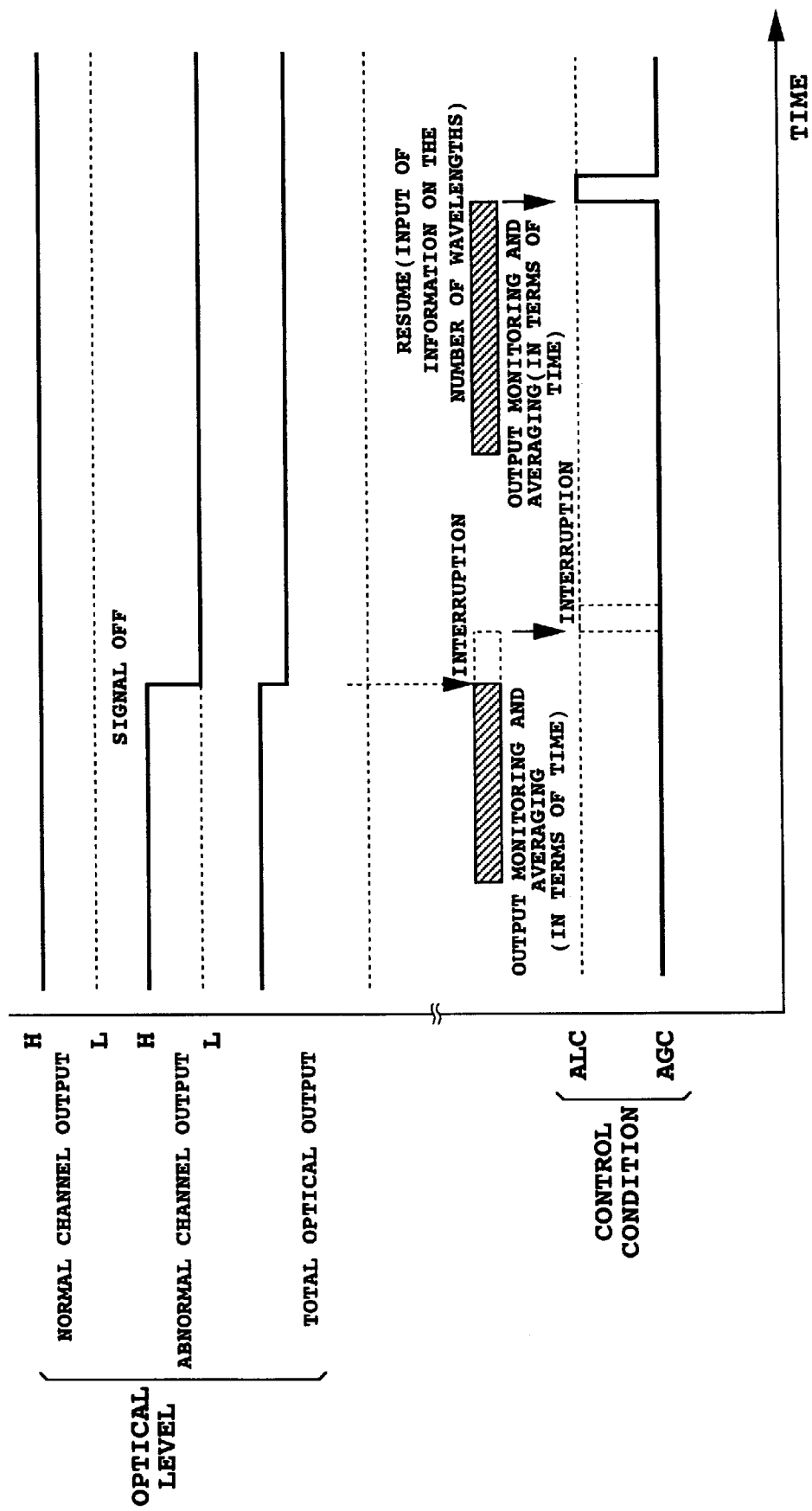

OPTICAL AMPLIFIER AND OPTICAL TRANSMISSION SYSTEM INCLUDING THE OPTICAL AMPLIFIER

BACKGROUND OF THE INVENTION

1. Field of the Invention

The present invention relates generally to wavelength division multiplexing (WDM) using a plurality of optical signals having different wavelengths, and more particularly to an optical amplifier applied to WDM and an optical transmission system including the optical amplifier.

2. Description of the Related Art

In recent years, a manufacturing technique and using technique for a low-loss (e.g., 0.2 dB/km) optical fiber have been established, and an optical communication system using the optical fiber as a transmission line has been put to practical use. Further, to compensate for losses in the optical fiber and thereby allow long-haul transmission, an optical amplifier for amplifying signal light has been put to practical use.

An optical amplifier known in the art includes an optical amplifying medium to which signal light to be amplified is supplied and means for pumping (exciting) the optical amplifying medium so that the optical amplifying medium provides a gain band including the wavelength of the signal light. For example, an erbium doped fiber amplifier (EDFA) includes an erbium doped fiber (EDF) as the optical amplifying medium and a pump light source for supplying pump light having a predetermined wavelength to the EDF. By preliminarily setting the wavelength of the pump light within a 0.98 $\mu$m band or a 1.48 $\mu$m band, a gain band including a wavelength of 1.55 $\mu$m can be obtained. Further, another type optical amplifier having a semiconductor chip as the optical amplifying medium is also known. In this case, the pumping is performed by injecting an electric current into the semiconductor chip.

As a technique for increasing a transmission capacity by a single optical fiber, wavelength division multiplexing (WDM) is known. In a system adopting WDM, a plurality of optical carriers having different wavelengths are used. The plural optical carriers are individually modulated to thereby obtain a plurality of optical signals, which are wavelength division multiplexed by an optical multiplexer to obtain WDM signal light, which is output to an optical fiber transmission line. On the receiving side, the WDM signal light received is separated into individual optical signals by an optical demultiplexer, and transmitted data is reproduced according to each optical signal. Accordingly, by applying WDM, the transmission capacity in a single optical fiber can be increased according to the number of WDM channels.

Accordingly, by combining an optical amplifier and WDM, the span and capacity of an optical transmission system can be increased.

In the case of incorporating an optical amplifier into a system adopting WDM, a transmission distance is limited by gain characteristics (wavelength dependence of gain) which is represented by a gain deviation or gain tilt. For example, in an EDFA, a gain deviation is produced at wavelengths in the vicinity of 1.55 $\mu$m. When a plurality of EDFAs are cascaded to cause accumulation of gain deviations, an optical SNR (signal-to-noise ratio) in a channel included in a band giving a small gain is degraded.

Automatic gain control (AGC) is effective for maintaining the gain characteristics of an optical amplifier constant. However, in the case of performing AGC only, there is a possibility that an optical output level per channel may not be maintained constant. If the optical output level exceeds a tolerable range, transmission characteristics are degraded by the influence of nonlinear effects occurring in an optical fiber transmission line especially in the case of high-speed transmission at rates over 10 Gb/s. Accordingly, to suppress the degradation in transmission characteristics due to the influence of nonlinear effects, stabilization of the optical output level is essential. To this end, automatic output level control (ALC) is effective. However, in the case of performing ALC only, the gain characteristics of an optical amplifier are not always maintained constant.

SUMMARY OF THE INVENTION

It is therefore an object of the present invention to provide an optical amplifier which can eliminate the inconvenience occurring in the case of performing only one of AGC (automatic gain control) and ALC (automatic output level control).

It is another object of the present invention to provide a novel optical transmission system including such an optical amplifier.

In accordance with an aspect of the present invention, there is provided an optical amplifier comprising an optical amplifying unit having a gain for wavelength division multiplexed (WDM) signal light obtained by wavelength division multiplexing a plurality of optical signals having different wavelengths; first control means for detecting an output level of the optical amplifying unit and controlling the optical amplifying unit so that the output level becomes constant; second control means for detecting the gain according to an input level of the optical amplifying unit and the output level and controlling the optical amplifying unit so that the gain becomes constant; and selecting means for alternatively selecting and operating the first and second control means in accordance with a predetermined rule.

With this configuration, the first control means for ALC (automatic output level control) and the second control means for AGC (automatic gain control) are alternatively selected in accordance with a predetermined rule. Accordingly, the inconvenience occurring in the case of performing only one of ALC and AGC can be eliminated.

In accordance with another aspect of the present invention, there is provided an optical transmission system comprising an optical fiber transmission line and at least one optical amplifier provided in the optical fiber transmission line. The optical amplifier has the configuration according to the present invention as mentioned above.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 11 is a time chart showing an example of the operation of the optical amplifier in the preferred embodiment shown in FIG. 2;

FIG. 16 is a time chart showing still another example of the operation of the optical amplifier in the preferred embodiment shown in FIG. 13.

DESCRIPTION OF THE PREFERRED EMBODIMENTS

Some preferred embodiments of the present invention will now be described in detail with reference to the attached drawings.

Figure 1:
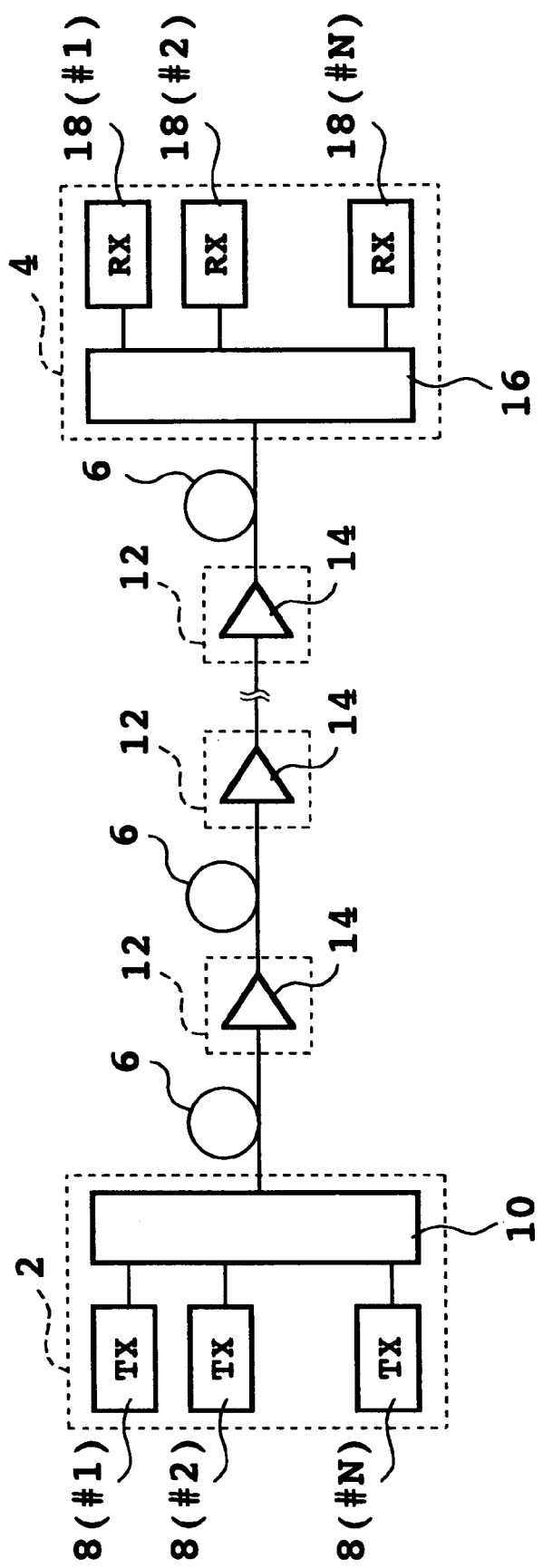
FIG. 1 is a block diagram showing a preferred embodiment of the optical transmission system according to the present invention.

FIG. 1 is a block diagram showing a preferred embodiment of the optical transmission system according to the present invention. This system includes a first terminal station or equipment 2 for transmission, a second terminal station or equipment 4 for reception, and an optical fiber transmission line 6 for connecting the terminal stations 2 and 4. The first terminal station 2 includes a plurality of optical transmitters (TX) 8 (#1 to #N) for outputting a plurality of optical signals having different wavelengths, and an optical multiplexer 10 for wavelength division multiplexing these optical signals to obtain WDM signal light. The WDM signal light is supplied to the optical fiber transmission line 6. A plurality of optical repeaters 12 are provided in the optical fiber transmission line 6. Each optical repeater 12 includes an in-line optical amplifier 14 for amplifying the WDM signal light. The second terminal station 4 includes an optical demultiplexer 16 for separating the WDM signal light supplied from the optical fiber transmission line 6 according to wavelengths to obtain a plurality of optical signals in individual channels, and a plurality of optical receivers (RX) 18 (#1 to #N) for receiving these optical signals, respectively.

With this configuration shown in FIG. 1, a transmission capacity can be increased according to the number of channels because wavelength division multiplexing (WDM) is applied. Further, long-haul transmission can be achieved with a simple configuration because each optical repeater 12 includes the in-line optical amplifier 14.

Figure 2:
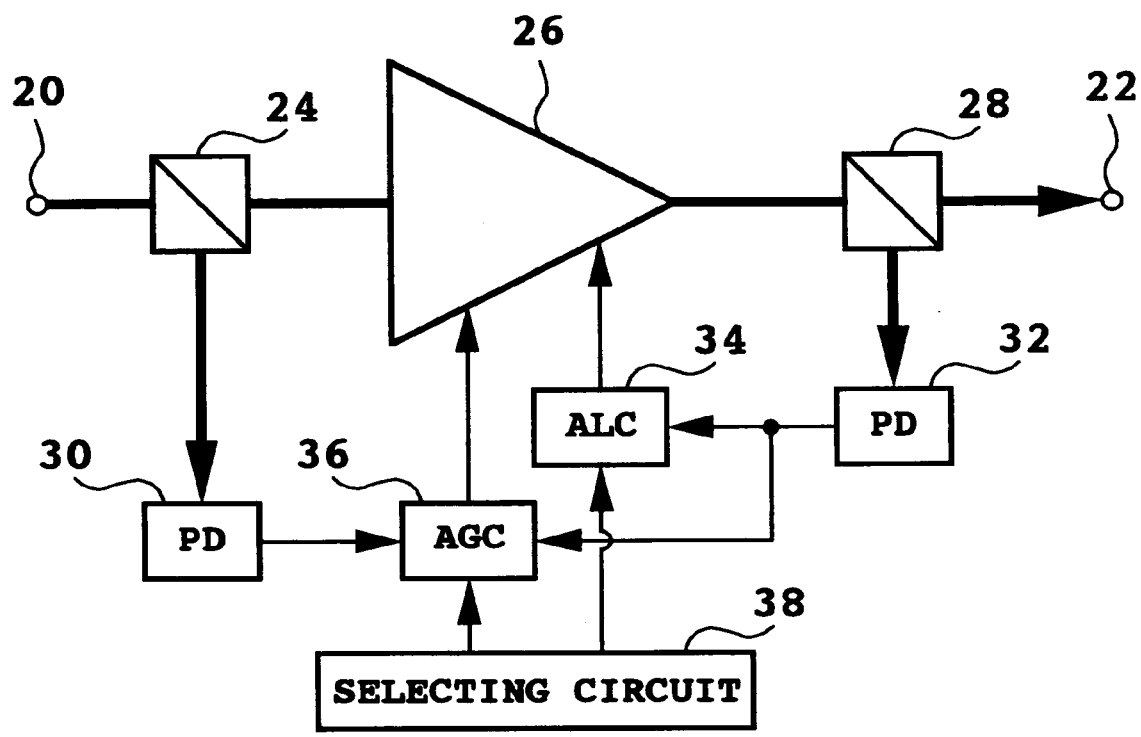
FIG. 2 is a block diagram showing a preferred embodiment of the optical amplifier according to the present invention.

FIG. 2 is a block diagram showing a preferred embodiment of the optical amplifier according to the present invention. An optical coupler 24, an optical amplifying unit 26, and an optical coupler 28 are provided in this order in terms of a propagation direction of WDM signal light between an input port 20 and an output port 22. A part of the WDM signal light supplied to the input port 20 is branched off by the optical coupler 24, and the remaining part of the WDM signal light is supplied to the optical amplifying unit 26. The branch light extracted by the optical coupler 24 is converted into an electrical signal corresponding to the power of the branch light by a photodetector 30 such as a photodiode. The optical amplifying unit 26 amplifies the WDM signal light supplied. A part of the amplified WDM signal light is branched off by the optical coupler 28, and the remaining part of the amplified WDM signal light is output from the output port 22. The branch light extracted by the optical coupler 28 is converted into an electrical signal corresponding to the power of the branch light by a photodetector 32.

An ALC (automatic output level control) circuit 34 detects an output level of the optical amplifying unit 26 according to the electrical signal from the photodetector 32 and controls the optical amplifying unit 26 so that the output level becomes constant. An AGC (automatic gain control) circuit 36 detects a gain of the optical amplifying unit 26 according to the electrical signals from the photodetectors 30 and 32 and controls the optical amplifying unit 26 so that the gain becomes constant. More specifically, the AGC circuit 36 controls the optical amplifying unit 26 so that a level ratio or level difference between the electrical signals from the photodetectors 30 and 32 becomes constant. A selecting circuit 38 alternatively selects and operates the ALC circuit 34 and the AGC circuit 36 in accordance with a predetermined rule. Specific embodiments of the predetermined rule will be hereinafter described.

Figure 3:
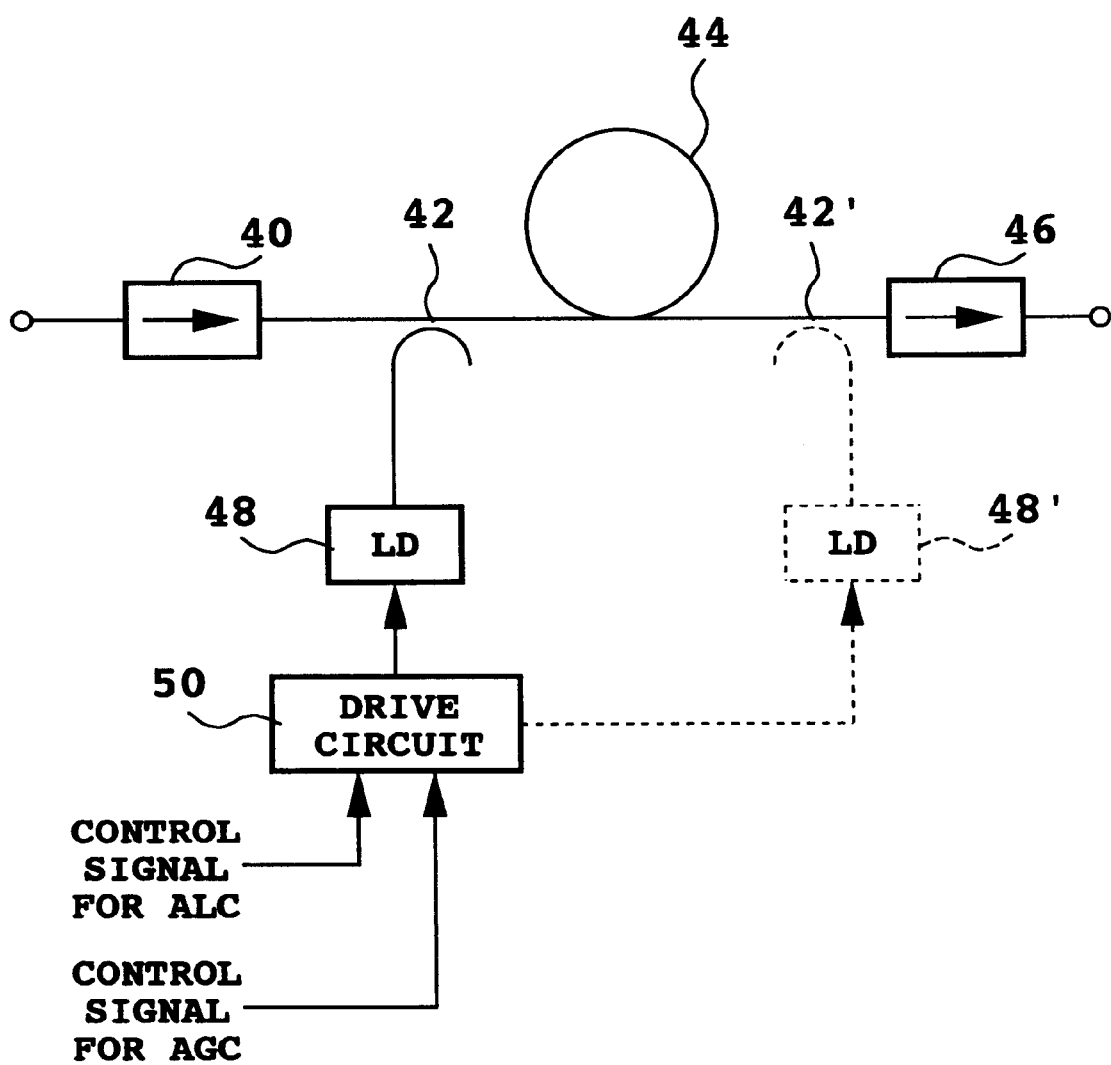
FIG. 3 is a block diagram of an optical amplifying unit applicable to the present invention.

FIG. 3 is a block diagram of an optical amplifying unit applicable to the present invention. This optical amplifying unit can be used as the optical amplifying unit 26 shown in FIG. 2.

An optical isolator 40, a WDM coupler 42, an EDF (erbium doped fiber) 44, and an optical isolator 46 are provided in this order in terms of a propagation direction of WDM signal light. The WDM signal light is forward supplied through the optical isolator 40 and the WDM coupler 42 in this order to the EDF 44. Pump light from a laser diode (LD) 48 as a pump light source is forward supplied through the WDM coupler 42 to the EDF 44. When the WDM signal light is supplied to the EDF 44 being pumped by the pump light, the WDM signal light is amplified in accordance with the principle of stimulated emission. The amplified WDM signal light is output through the optical isolator 46.

A drive current is supplied from a drive circuit 50 to the laser diode 48. When the ALC circuit 34 shown in FIG. 2 is selected by the selecting circuit 38, the drive circuit 50 adjusts the drive current for the laser diode 48 so that the output level of the optical amplifying unit 26 becomes constant, according to a control signal from the ALC circuit 34, thereby controlling the power of the pump light. On the other hand, when the AGC circuit 36 shown in FIG. 2 is selected by the selecting circuit 38, the drive circuit 50 adjusts the drive current for the laser diode 48 so that the gain of the optical amplifying unit 26 becomes constant, according to a control signal from the AGC circuit 36, thereby controlling the power of the pump light.

While the EDF 44 is used as an optical amplifying medium to which the pump light is supplied in this preferred embodiment, a doped fiber doped with any one of the other rare earth elements such as Nd and Yb may be used as the optical amplifying medium.

While both the WDM signal light and the pump light forward propagate in the EDF 44, that is, forward pumping is carried out in this preferred embodiment, the propagation directions of the WDM signal light and the pump light in the EDF 44 may be made opposite to each other by providing a WDM coupler 42' and a laser diode 48' downstream of the EDF 44 in terms of the propagation direction of the WDM signal light, thereby effecting backward pumping. Alternatively, forward pumping and backward pumping may be simultaneously carried out to effect bidirectional pumping.

Figure 4:
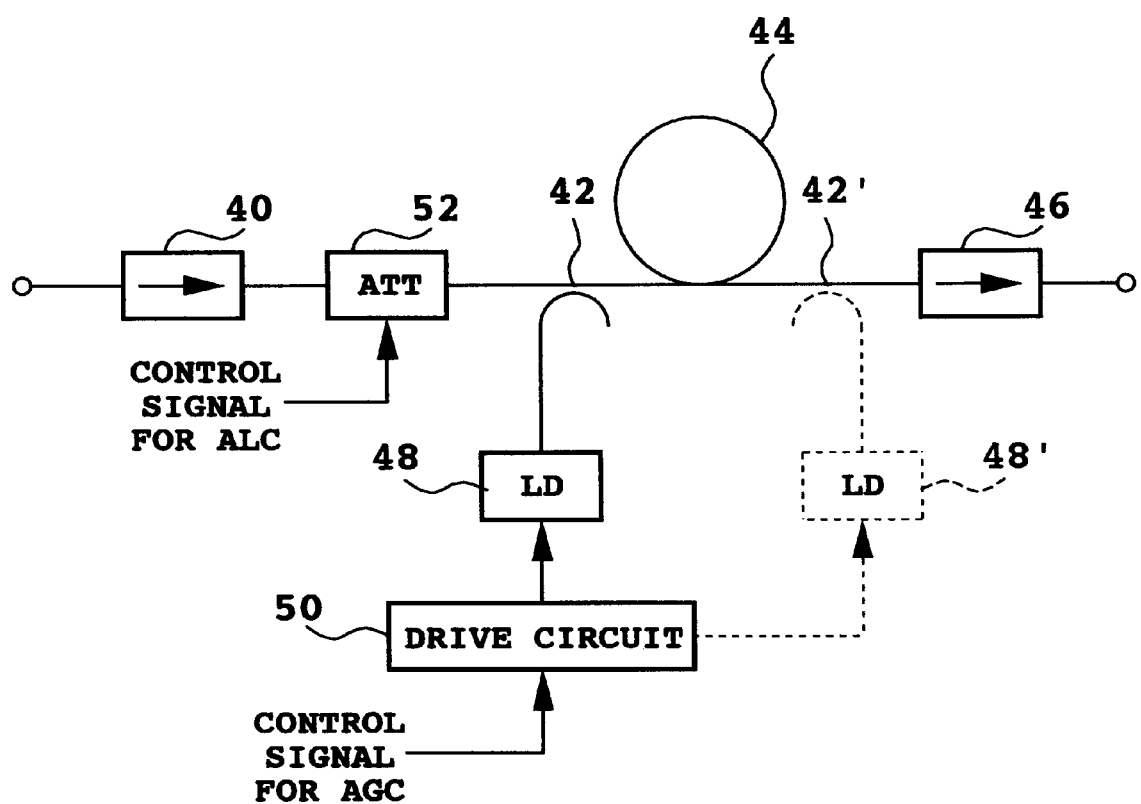
FIG. 4 is a block diagram of another optical amplifying unit applicable to the present invention.

FIG. 4 is a block diagram of another optical amplifying unit applicable to the present invention. This optical amplifying unit can be used as the optical amplifying unit 26 shown in FIG. 2. In contrast with the optical amplifying unit shown in FIG. 3, the optical amplifying unit shown in FIG. 4 is characterized in that an optical attenuator (ATT) 52 having a variable attenuation is additionally provided between the optical isolator 40 and the WDM coupler 42. When the ALC circuit 34 shown in FIG. 2 is selected by the selecting circuit 38, the attenuation of the optical attenuator 52 is adjusted so that the output level of the optical amplifying unit 26 becomes constant according to a control signal from the ALC circuit 34, thereby controlling the power of the WDM signal light to be supplied to the EDF 44. On the other hand, when the AGC circuit 36 shown in FIG. 2 is selected by the selecting circuit 38, the drive current for the laser diode 48 is adjusted so that the gain of the optical amplifying unit 26 becomes constant according to a control signal from the AGC circuit 36, thereby controlling the power of the pump light. Further, in the case that the attenuation of the optical attenuator 52 is adjusted by the ALC circuit 34, the power of the pump light is preferably maintained constant so that the gain characteristics of the EDF 44 are maintained constant.

While the optical attenuator 52 is provided upstream of the EDF 44 in terms of the propagation direction of the WDM signal light, the optical attenuator 52 may be provided downstream of the EDF 44.

In the case that the wavelengths of the WDM signal light to be amplified are included in a 1.55 $\mu$mm band (e.g., 1.50 $\mu$m to 1.60 $\mu$m), the wavelength of the pump light is preferably set to fall within a 0.98 $\mu$m band (e.g., 0.97 $\mu$m to 0.99 $\mu$m) or a 1.48 $\mu$m band (e.g., 1.47 $\mu$m to 1.49 $\mu$m), thereby allowing high-gain and low-noise amplification of the WDM signal light.

Figure 5:
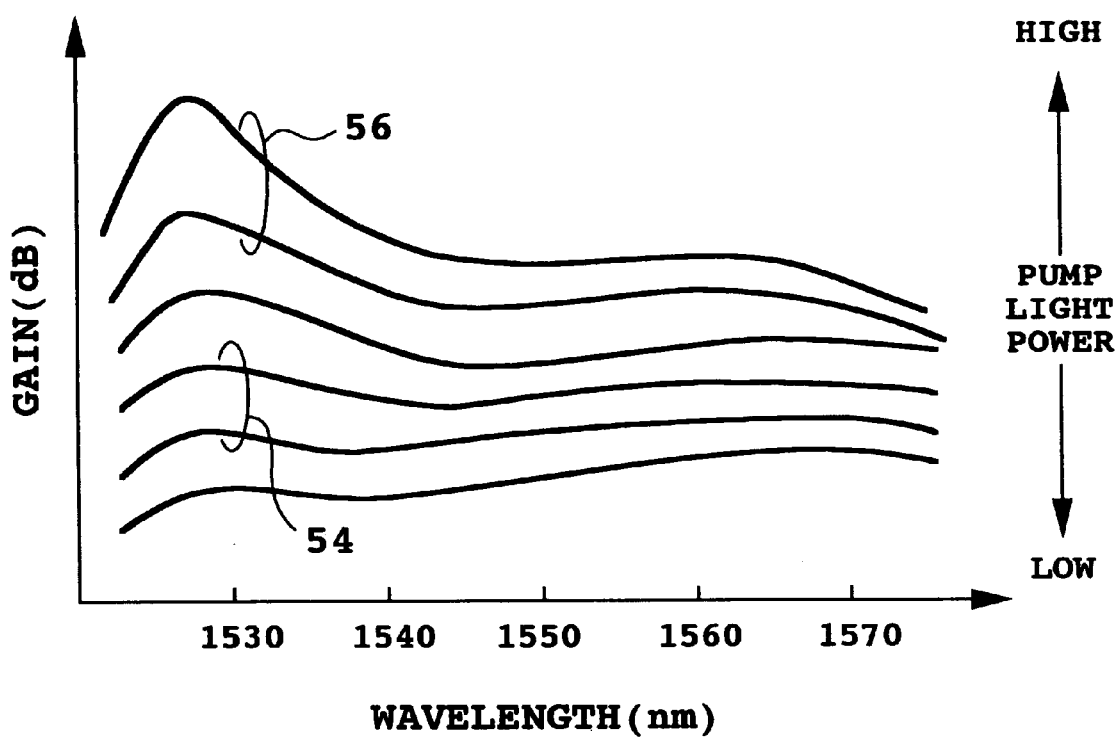
FIG. 5 is a graph showing an example of gain characteristics of an EDF (erbium doped fiber)

FIG. 5 is a graph showing an example of gain characteristics of an EDF. In FIG. 5, the vertical axis represents gain (dB), and the horizontal axis represents wavelength (nm). In an EDF, the flatness of its gain characteristics is reduced with an increase in pump light power or pumping rate. Reference numeral 54 denotes the gain characteristics in normal operations, showing relatively good flatness. Reference numeral 56 denotes the gain characteristics when the pump light power is increased, showing a difference in optical output level between at a wavelength near 1530 nm and at a wavelength falling within a band of 1540 to 1560 nm, thus producing a gain deviation. Accordingly, in the case of amplifying WDM signal light, maintaining the gain characteristics as shown by reference numeral 54 with good flatness is effective in reducing the influence due to accumulation of level differences.

Figure 6A:
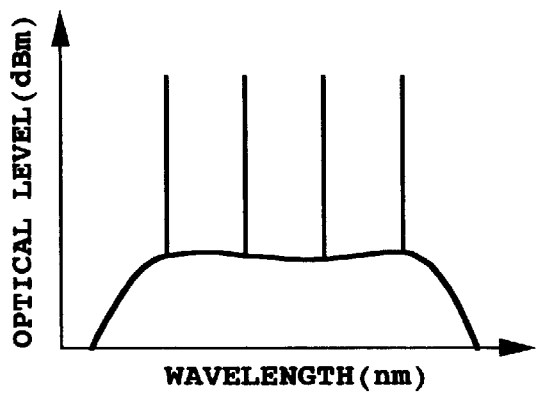
FIGS. 6A to 6D are graphs showing a change in spectrum due to a decrease in number of wavelengths in ALC (automatic level control)
Figure 6B:
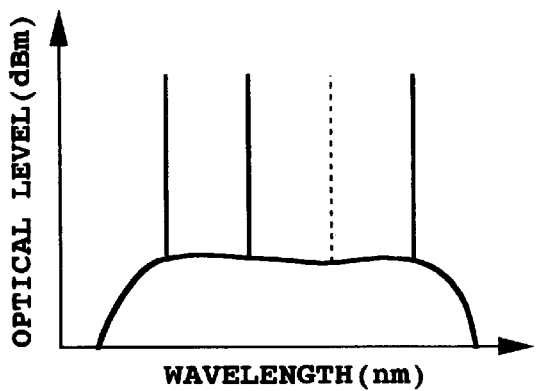
Figure 6C:
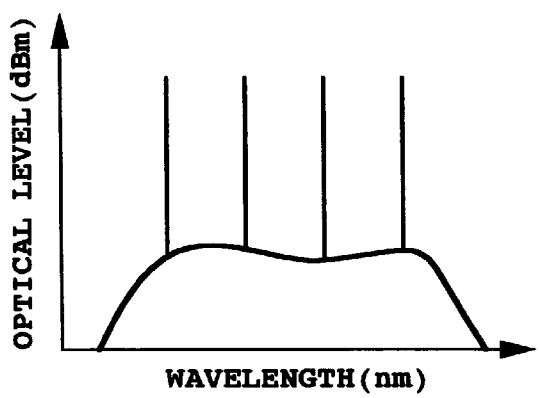
Figure 6D:
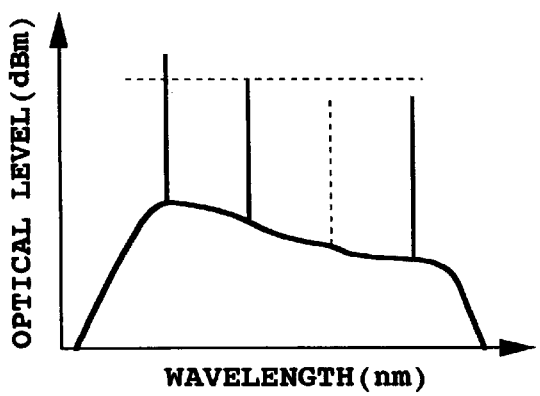

FIGS. 6A to 6D are graphs showing a change in spectrum due to a decrease in number of wavelengths in the case of performing ALC only. When four channels of WDM signal light having a constant input level is input to an optical amplifier as shown in FIG. 6A and one channel of optical signal is cut off to result in a decrease in number of wavelengths as shown in FIG. 6B, an output spectrum corresponding to an input spectrum as shown in FIG. 6C changes as shown in FIG. 6D. That is, when the number of wavelengths decreases, a total output level is increased to a fixed value by ALC, so that output levels in individual channels become different, and the flatness of gain characteristics is also not maintained.

Figure 7A:
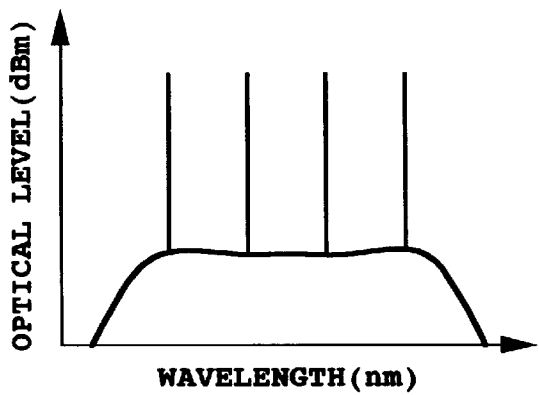
FIGS. 7A to 7D are graphs showing a change in spectrum due to a decrease in optical input level in ALC.
Figure 7B:
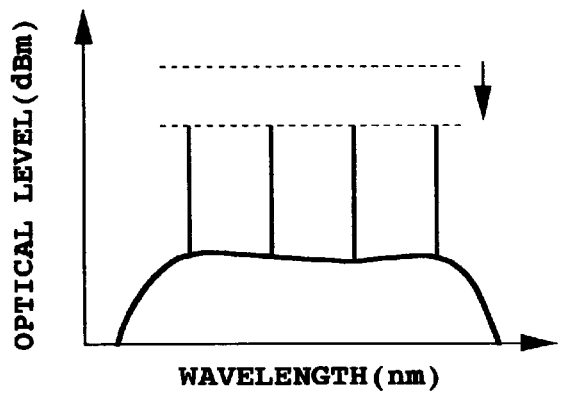
Figure 7C:
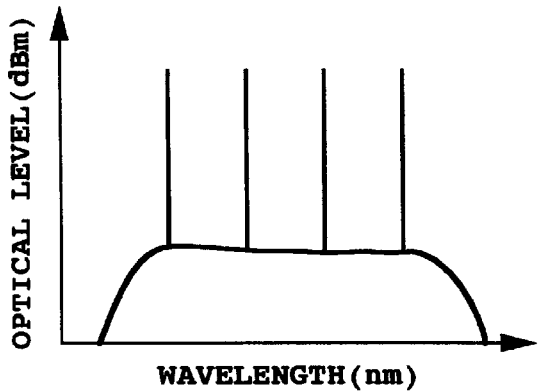
Figure 7D:
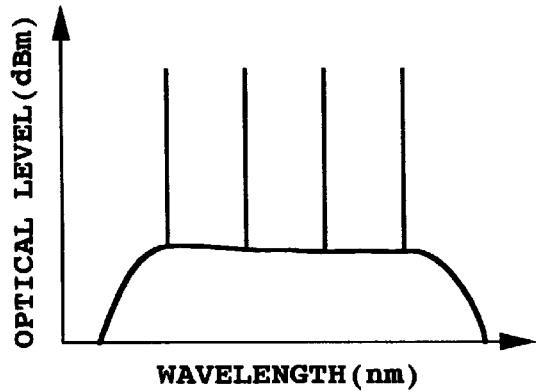

FIGS. 7A to 7D are graphs showing a change in spectrum due to a decrease in optical input level in the case of performing ALC only. When four channels of WDM signal light having a constant input level is input to an optical amplifier as shown in FIG. 7A and the input level is generally decreased as shown in FIG. 7B, an output spectrum corresponding to an input spectrum as shown in FIG. 7C does not almost change as shown in FIG. 7D. In this case, the ALC is assumed to be performed by using an optical attenuator as shown in FIG. 4. In this manner, an optical output level per channel can be maintained constant against a general change in optical input level by performing specific ALC.

Figure 8A:
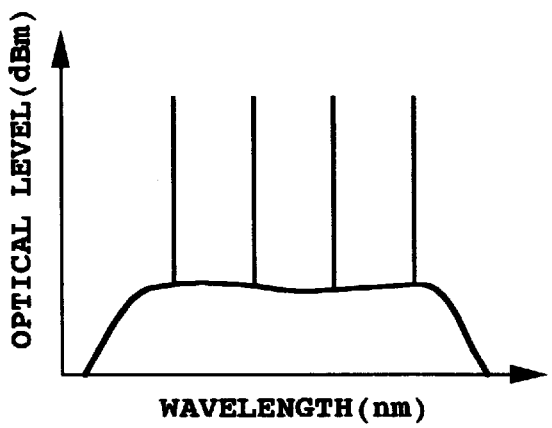
FIGS. 8A to 8D are graphs showing a change in spectrum due to a decrease in number of wavelengths in AGC (automatic gain control)
Figure 8B:
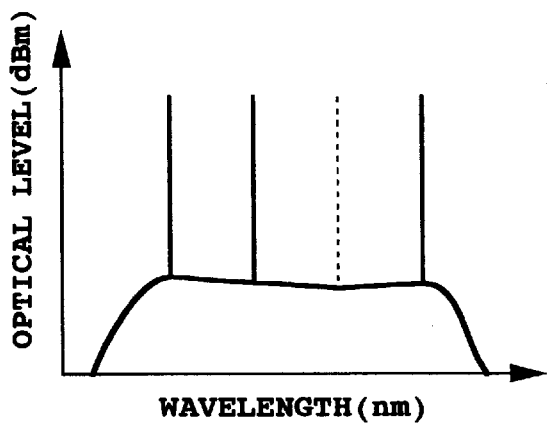
Figure 8C:
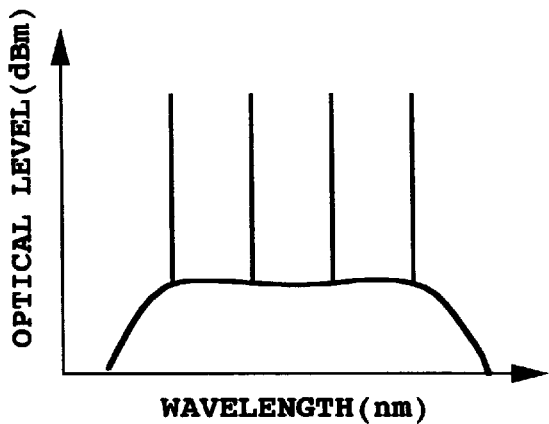
Figure 8D:
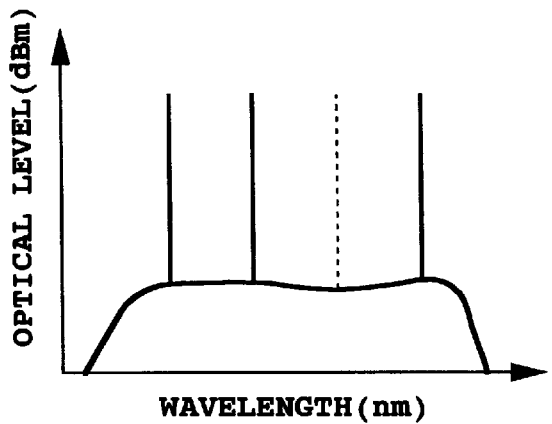

FIGS. 8A to 8D are graphs showing a change in spectrum due to a decrease in number of wavelengths in the case of performing AGC only. When four channels of WDM signal light having a constant input level are input to an optical amplifier as shown in FIG. 8A and one channel of optical signal is cut off to result in a decrease in number of wavelengths as shown in FIG. 8B, an output spectrum corresponding to an input spectrum as shown in FIG. 8C changes as shown in FIG. 8D. That is, although the spectrum of the cut-off channel of optical signal disappears, the other channels do not almost change. In this manner, even when the number of wavelengths changes, an optical output level per channel can be maintained constant, and the flatness of gain characteristics is also maintained by AGC.

Figure 9A:
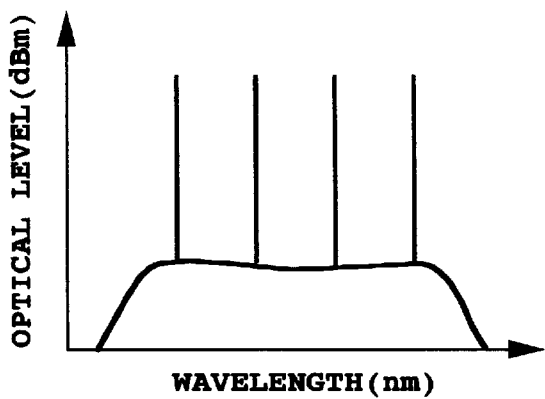
FIGS. 9A to 9D are graphs showing a change in spectrum due to a decrease in optical input level in AGC.
Figure 9B:
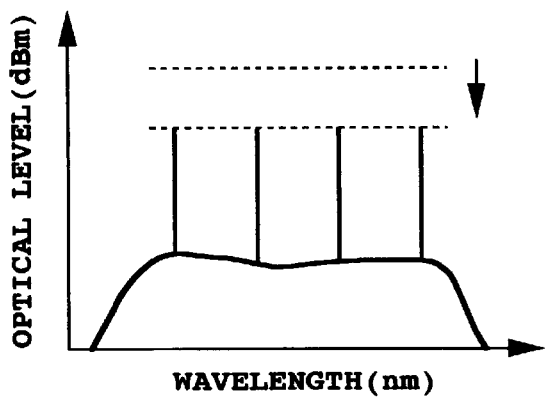
Figure 9C:
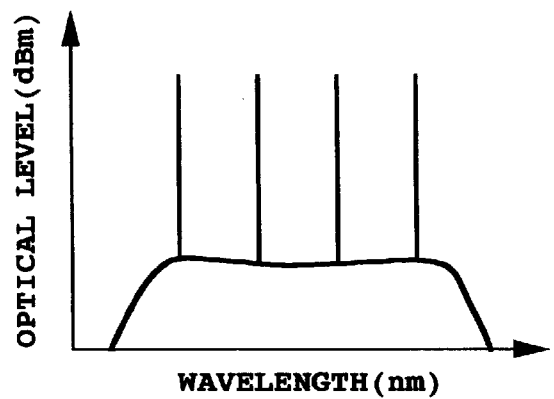
Figure 9D:
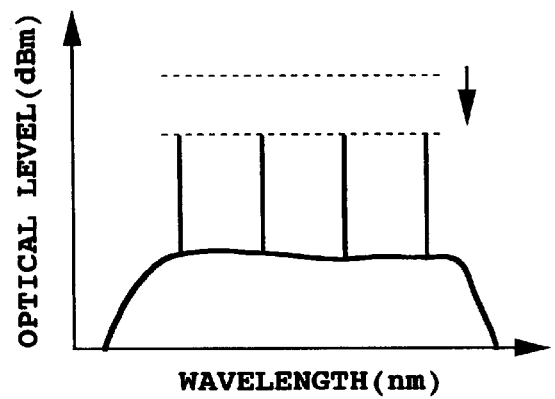
Figure 10A:
FIG. 10A is a block diagram showing a configuration of an in-line amplifier system.

FIGS. 9A to 9D are graphs showing a change in spectrum due to a decrease in optical input level in the case of performing AGC only. When four channels of WDM signal light having a constant input level are input to an optical amplifier as shown in FIG. 9A and the input level is generally decreased as shown in FIG. 9B, an output spectrum corresponding to an input spectrum as shown in FIG. 9C changes as shown in FIG. 9D. In this manner, the flatness of gain characteristics is substantially maintained because a pumping condition does not almost change in a tolerable range. However, the optical output level changes by a change in input level. As a result, in an in-line amplifier system as shown in FIG. 10A, variations in transmission line loss directly appear as variations in output level. If such variations in output level are accumulated, transmission characteristics are degraded by the influence of nonlinear effects as mentioned above.

Figure 10B:
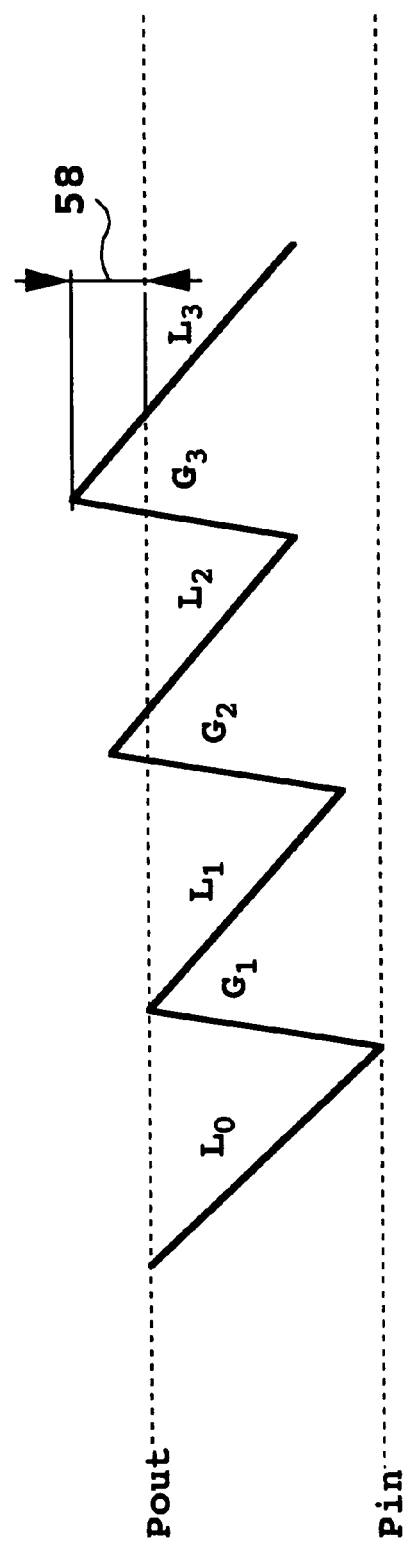
FIG. 10B is a level diagram in the in-line amplifier system shown in FIG. 10A.

The accumulation of errors in output level in the case of performing AGC only in the in-line amplifier system as shown in FIG. 10A will now be described with reference to the level diagram shown in FIG. 10B. As shown in FIG. 10A, the in-line amplifier system includes an E/O converter (optical transmitter), postamplifier having a gain $G_0$, optical fiber transmission line having a loss $L_0$, first in-line amplifier having a gain $G_1$, optical fiber transmission line having a loss $L_1$, second in-line amplifier having a gain $G_2$, optical fiber transmission line having a loss $L_2$, third in-line amplifier having a gain $G_3$, optical fiber transmission line having a loss $L_3$, preamplifier having a gain $G_4$, and O/E converter (optical receiver) provided in this order in terms of a transmission direction. In the level diagram shown in FIG. 10B, $P_{OUT}$ represents a target value of the output level of each amplifier, and $P_{IN}$ represents a target value of the input level of each amplifier. Since the gains $G_1$, $G_2$, and $G_3$ are generally set equal to each other, variations in the loss between the optical fiber transmission lines become errors in the output level, and there is a possibility that the errors may be accumulated to result in an excess output level highly beyond the target value, as shown by the reference numeral 58.

FIG. 11 is a time chart showing an example of the operation of the optical amplifier in the preferred embodiment shown in FIG. 2. In this example, the selecting circuit 38 shown in FIG. 2 includes counting means such as a timer (not shown), and periodically switches between the operation of the ALC circuit 34 over a first given period of time and the operation of the AGC circuit 36 over a second given period of time. More specifically, as shown in FIG. 11, the AGC circuit 36 operates normally (most time), and the ALC circuit 34 periodically operates by a given period of time (the first given period of time).

According to this operation, variations in total optical output level assumed in the case of performing AGC only can be compensated to thereby make the total optical output level fall within a tolerable range. It is therefore preferable to set the first and second given periods of time so that the total optical output level does not fall outside the tolerable range. For example, the second given period of time for the operation of the AGC circuit 36 is set longer than the first given period of time for the operation of the ALC circuit 34, because variations in total optical output level in the case of performing AGC only are slight in general.

Thus, the inconvenience occurring in the case of performing only one of ALC and AGC can be eliminated according to the operation shown in FIG. 11.

Figure 12:
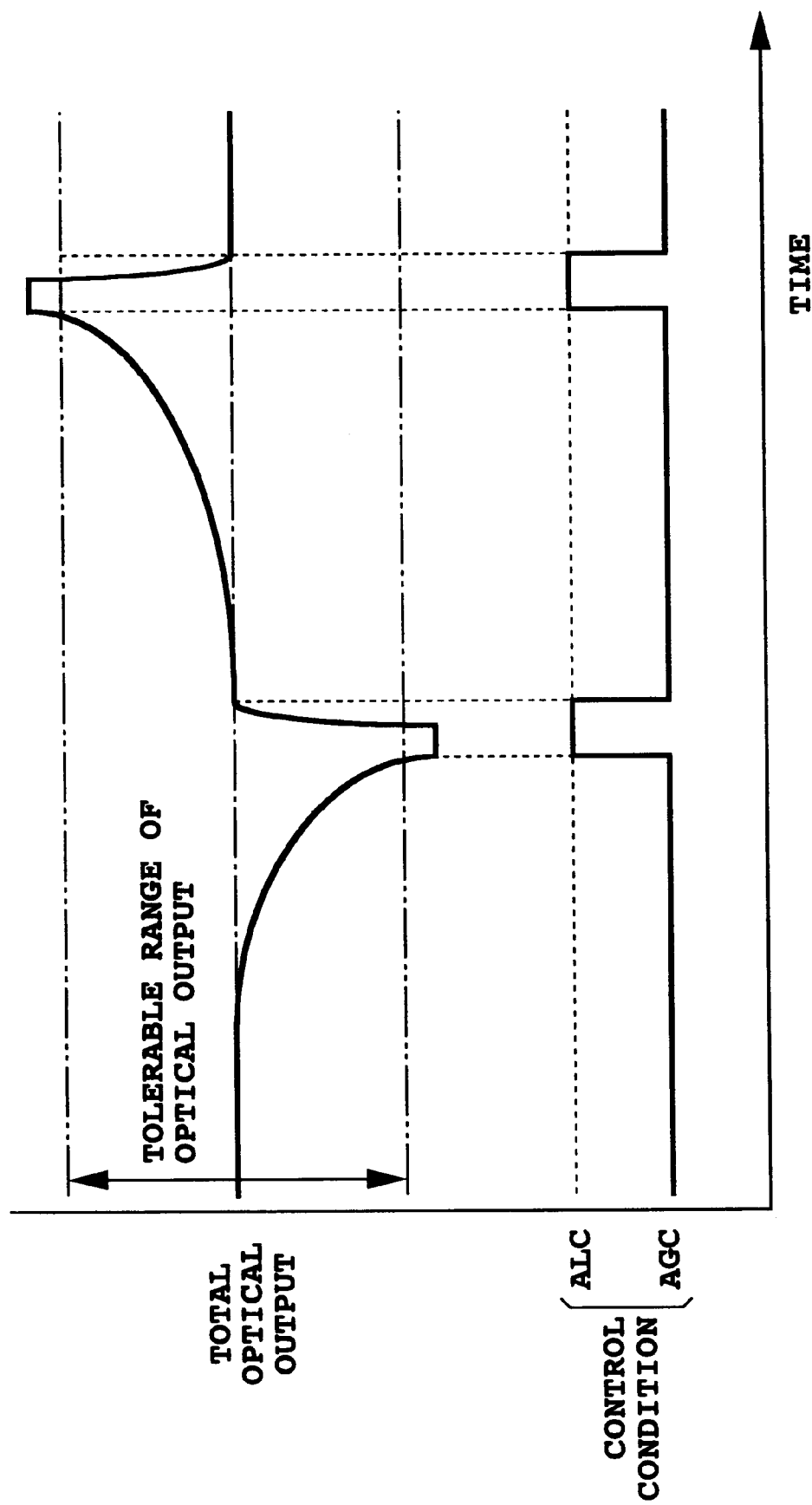
FIG. 12 is a time chart showing another example of the operation of the optical amplifier in the preferred embodiment shown in FIG. 2.

FIG. 12 is a time chart showing another example of the operation of the optical amplifier in the preferred embodiment shown in FIG. 2. In this example, the selecting circuit 38 shown in FIG. 2 switches from the operation of the AGC circuit 36 to the operation of the ALC circuit 34 when the total optical output level of the optical amplifying unit 26 falls outside a predetermined tolerable range. The ALC circuit 34 operates for a given period of time, for example, enough to return the total optical output level to a target value.

Such an operation of the selecting circuit 38 may be performed, for example, by incorporating an output signal from the photodetector 32.

According to this preferred embodiment, the total optical output level can be made to fall within a tolerable range including an operational margin, so that it is possible to eliminate the inconvenience occurring in the case of performing only one of ALC and AGC.

Figure 13:
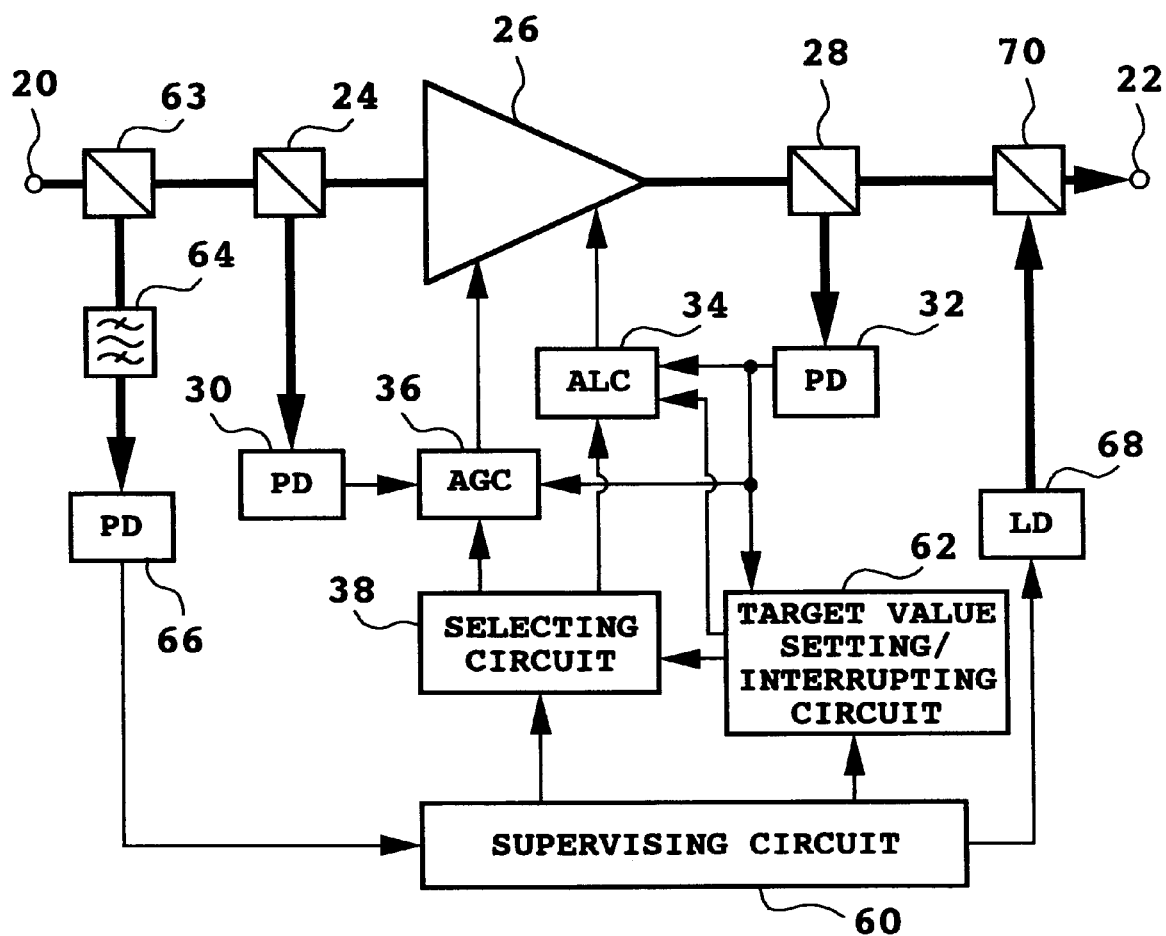
FIG. 13 is a block diagram showing another preferred embodiment of the optical amplifier according to the present invention.

FIG. 13 is a block diagram showing another preferred embodiment of the optical amplifier according to the present invention. In this preferred embodiment, the first terminal station 2 shown in FIG. 1 includes means for outputting a supervisory signal. For example, one of the optical transmitters 8 (#1 to #N) outputs an optical signal for supervision. In contrast with the optical amplifier shown in FIG. 2, the optical amplifier shown in FIG. 13 is characterized in that it further includes a supervising circuit 60 for receiving the supervisory signal and a target value setting/interrupting circuit 62.

An optical coupler 63 is provided between the input port 20 and the optical coupler 24 to branch off a part of WDM signal light. The branch light from the optical coupler 63 is passed through an optical band-pass filter 64 and converted into an electrical signal by a photodetector 66. The filter 64 transmits an optical signal for supervision. The electrical signal from the photodetector 66 is supplied to the supervising circuit 60. An output signal from the supervising circuit 60 is supplied to the selecting circuit 38 and the target value setting/interrupting circuit 62. Accordingly, the selecting circuit 38 can switch between the operation of the ALC circuit 34 and the operation of the AGC circuit 36 according to the supervisory signal supplied from the supervising circuit 60. The supervisory signal supplied to the supervising circuit 60 is updated therein, and the updated supervisory signal is converted into an optical signal by a laser diode 68. The optical signal from the laser diode 68 is added to the WDM signal light by an optical coupler 70 provided between the optical coupler 28 and the output port 22. The target value setting/interrupting circuit 62 also inputs an output signal from the photodetector 32, and supplies an output signal to the ALC circuit 34 and the selecting circuit 38.

With this configuration, flexible control can be performed according to the supervisory signal received. For example, a target value of the output level of the optical amplifying unit 26 to be controlled by the ALC circuit 34 can be changed according to the number of wavelengths of the WDM signal light. Alternatively, the target value of the output level can be changed according to a calculated time average of the output level of the optical amplifying unit 26 detected by the photodetector 32. In this case, the calculation of the time average may be interrupted when the output level is rapidly changed.

Some examples of the operation of the optical amplifier in the preferred embodiment shown in FIG. 13 will now be described.

Figure 14:
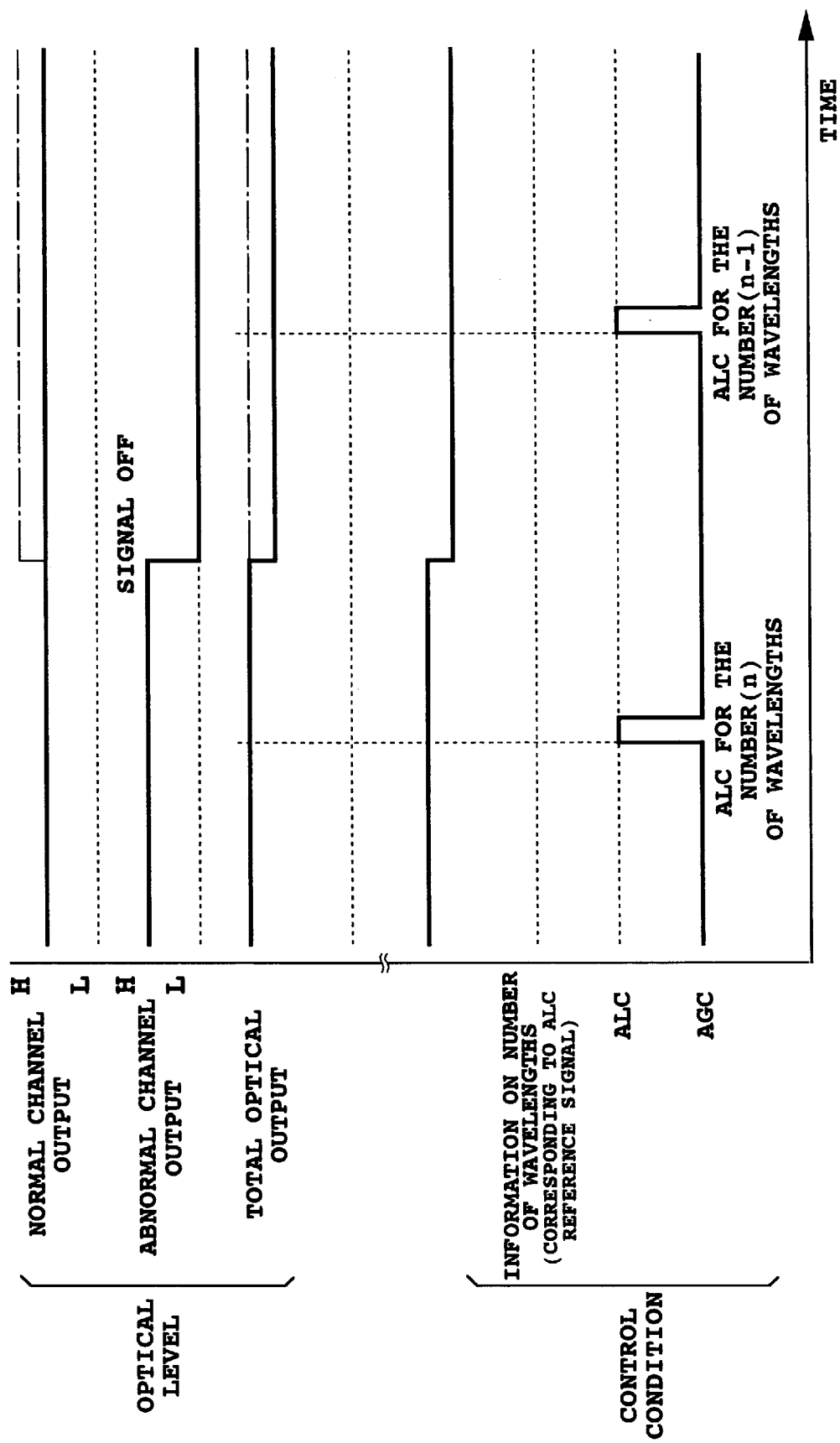
FIG. 14 is a time chart showing an example of the operation of the optical amplifier in the preferred embodiment shown in FIG. 13.

FIG. 14 is a time chart showing an example of the operation of the optical amplifier in the preferred embodiment shown in FIG. 13. In this example, the target value setting/interrupting circuit 62 reduces the target value of the output level of the optical amplifying unit 26 to be controlled by the ALC circuit 34 by utilizing the fact that when an optical signal in an abnormal channel becomes off, the total optical output level decreases and the output level of the photodetector 32 accordingly decreases. That is, the level of a reference signal for differential control in the ALC circuit 34 is changed according to information on the number of wavelengths of the WDM signal light. For example, letting n denote the number of wavelengths subjected to ALC before the optical signal in the abnormal channel becomes off, ALC for the number (n−1) of wavelengths is performed after the optical signal in the abnormal channel becomes off. According to this operation, the level of the optical signal in each channel can be maintained constant, thereby eliminating the inconvenience occurring in the case of performing only one of ALC and AGC.

While the target value setting/interrupting circuit 62 detects the number of wavelengths of the WDM signal light according to the output level of the photodetector 32 in the operation of FIG. 14, the target value setting/interrupting circuit 62 may detect the number of wavelengths according to the supervisory signal from the supervising circuit 60.

Figure 15:
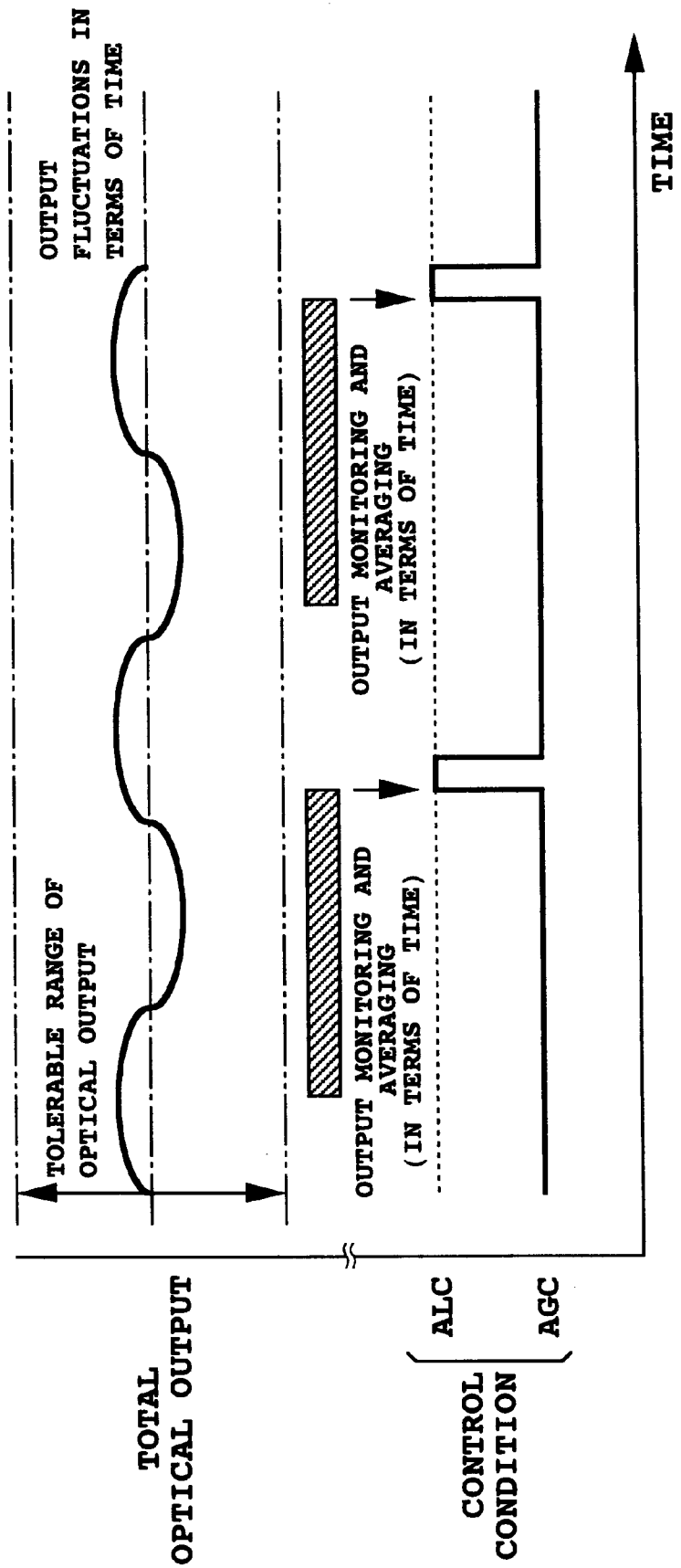
FIG. 15 is a time chart showing another example of the operation of the optical amplifier in the preferred embodiment shown in FIG. 13.

FIG. 15 is a time chart showing another example of the operation of the optical amplifier in the preferred embodiment shown in FIG. 13. As mentioned above, the optical output level in the case of performing AGC is not always maintained constant, but fluctuates in terms of time. In the operation of FIG. 15, the target value setting/interrupting circuit 62 calculates a time average of the output level of the optical amplifying unit 26 detected by the photodetector 32 and sets a target value of the output level of the optical amplifying unit 26 to be controlled by the ALC circuit 34 according to the time average calculated. It is sufficient that the calculation of the time average be made during a given period of time prior to a timing of switching from AGC to ALC.

FIG. 16 is a time chart showing still another example of the operation of the optical amplifier in the preferred embodiment shown in FIG. 13. In this example, the calculation of the time average is interrupted by the target value setting/interrupting circuit 62 in the case that an optical signal in an abnormal channel becomes off during the calculation of the time average in the operation of FIG. 15. The reason for this operation of FIG. 16 is that when the optical signal in the abnormal channel becomes off, the total optical output level of the optical amplifying unit 26 is reduced and therefore the calculated value of the time average becomes insignificant. Accordingly, when the calculation of the time average is interrupted, the switching operation by the selecting circuit 38 is preferably also interrupted. The break of the optical signal in the abnormal channel is detected in the target value setting/interrupting circuit 62 according to the output signal from the photodetector 32. After interruption of the time average, the target value setting/interrupting circuit 62 obtains information on the number of wavelengths according to the signal from the supervising circuit 60, and resets a target value of the output level of the optical amplifying unit 26 according to the information.

While the target value setting/interrupting circuit 62 operates according to the output signal from the photodetector 32 in the operation of the optical amplifier mentioned above, the circuit 62 may operate according to the output signal from the photodetector 30, that is, according to the input level of the optical amplifying unit 26.

Further, two or more optical amplifiers as mentioned above may be combined.

In addition, application of the optical amplifier according to the present invention is not limited to the system as shown in FIG. 1. For example, the optical amplifier according to the present invention is applicable also to a system including three or more terminal stations connected through an optical fiber network by use of an optical add/drop circuit.

As described above, according to the present invention, ALC and AGC are alternatively selected in accordance with a predetermined rule, so that the inconvenience occurring in the case of performing only one of AGC and ALC can be eliminated.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An optical amplifier comprising:
    an optical amplifying unit having a gain for wavelength division multiplexed (WDM) signal light obtained by wavelength division multiplexing a plurality of optical signals having different wavelengths;
    first control means for detecting an output level of said optical amplifying unit and controlling said optical amplifying unit so that said output level becomes constant;
    second control means for detecting said gain according to an input level of said optical amplifying unit and said output level and controlling said optical amplifying unit so that said gain becomes constant; and
    selecting means for alternatively selecting and operating said first and second control means in accordance with a predetermined rule.

2. An optical amplifier according to claim 1, wherein:
    said optical amplifying unit comprises an optical amplifying medium and a pump light source for supplying pump light to said optical amplifying medium; and
    said second control means comprises means for controlling the power of said pump light.

3. An optical amplifier according to claim 2, further comprising an optical attenuator operatively connected to said optical amplifying medium for giving a variable attenuation to said WDM signal light;
    said first control means controlling the attenuation of said optical attenuator.

4. An optical amplifier according to claim 2, wherein said first control means controls the power of said pump light.

5. An optical amplifier according to claim 2, wherein said optical amplifying medium comprises a doped fiber doped with a rare earth element.

6. An optical amplifier according to claim 1, wherein said selecting means switches between the operation of said first control means over a first given period of time and the operation of said second control means over a second given period of time.

7. An optical amplifier according to claim 6, wherein said first given period of time is shorter than said second given period of time.

8. An optical amplifier according to claim 1, further comprising means for changing a target value of said output level to be controlled by said first control means according to the number of wavelengths of said WDM signal light.

9. An optical amplifier according to claim 1, further comprising:
    means for calculating a time average of said output level detected by said first control means; and
    means for changing a target value of said output level to be controlled by said first control means according to said time average.

10. An optical amplifier according to claim 9, further comprising means for interrupting calculation of said time average when said output level is rapidly changed.

11. An optical amplifier according to claim 1, wherein said selecting means switches from the operation of said second control means to the operation of said first control means when said output level detected by said first control means falls outside a predetermined range.

12. An optical transmission system comprising:
    an optical fiber transmission line; and
    at least one optical amplifier provided in said optical fiber transmission line;

said at least one optical amplifier each comprising:
an optical amplifying unit having a gain for wavelength division multiplexed (WDM) signal light obtained by wavelength division multiplexing a plurality of optical signals having different wavelengths;
first control means for detecting an output level of said optical amplifying unit and controlling said optical amplifying unit so that said output level becomes constant;
second control means for detecting said gain according to an input level of said optical amplifying unit and said output level and controlling said optical amplifying unit so that said gain becomes constant; and
selecting means for alternatively selecting and operating said first and second control means in accordance with a predetermined rule.

13. An optical transmission system according to claim 12, further comprising:
a first terminal equipment for supplying said WDM signal light to said optical fiber transmission line at one end thereof; and
a second terminal equipment for receiving said WDM signal light from said optical fiber transmission line at the other end thereof.

14. An optical transmission system according to claim 13, wherein:
said first terminal equipment includes means for outputting a supervisory signal;
said optical amplifier further comprises means for receiving said supervisory signal; and
said selecting means switches between the operation of said first control means and the operation of said second control means according to said supervisory signal.

15. An optical transmission system according to claim 12, wherein:
said optical amplifying unit comprises an optical amplifying medium and a pump light source for supplying pump light to said optical amplifying medium; and
said second control means comprises means for controlling the power of said pump light.

16. An optical transmission system according to claim 15, wherein said optical amplifier further comprises an optical attenuator operatively connected to said optical amplifying medium for giving a variable attenuation to said WDM signal light;
said first control means controlling the attenuation of said optical attenuator.

17. An optical transmission system according to claim 15, wherein said first control means controls the power of said pump light.

18. An optical transmission system according to claim 15, wherein said optical amplifying medium comprises a doped fiber doped with a rare earth element.

19. An optical transmission system according to claim 12, wherein said selecting means switches between the operation of said first control means over a first given period of time and the operation of said second control means over a second given period of time.

20. An optical transmission system according to claim 19, wherein said first given period of time is shorter than said second given period of time.

21. An optical transmission system according to claim 12, wherein said optical amplifier further comprises means for changing a target value of said output level to be controlled by said first control means according to the number of wavelengths of said WDM signal light.

22. An optical transmission system according to claim 12, wherein said optical amplifier further comprises:
means for calculating a time average of said output level detected by said first control means; and
means for changing a target value of said output level to be controlled by said first control means according to said time average.

23. An optical transmission system according to claim 22, wherein said optical amplifier further comprises means for interrupting calculation of said time average when said output level is rapidly changed.

24. An optical transmission system according to claim 12, wherein said selecting means switches from the operation of said second control means to the operation of said first control means when said output level detected by said first control means falls outside a predetermined range.

25. An apparatus comprising:
an optical amplifier amplifying a light;
an output level controller selectable to control an output level of the optical amplifier to be constant;
a gain controller selectable to control gain of the optical amplifier to be constant; and
a selector alternately selecting the output level controller and the gain controller.

26. An apparatus according to claim 25, wherein the output level controller comprises an optical attenuator having a variable attenuation for attenuating the light, the output level controller controlling the attenuation to cause the output level to be constant.

27. An apparatus according to claim 25, wherein
the optical amplifier comprises an optical amplifying medium and a pump light source supplying pump light to the optical amplifying medium to amplify the light as the light travels through the optical amplifying medium, and
the output level controller controls power of the pump light to cause the output level to be constant.

28. An apparatus according to claim 25, wherein the selector selects the gain controller for a first period of time, and selects the output level controller for a second period of time different in length than the first period of time.

29. An apparatus according to claim 28, wherein the second period of time is shorter than the first period of time.

30. An apparatus according to claim 25, wherein the light is a wavelength division multiplexed (WDM) signal light including a plurality of optical signals of different wavelengths multiplexed together, the apparatus further comprising:
an output level setting device setting a target value of the output level in accordance with the number of optical signals multiplexed together in the WDM signal light.

31. An apparatus according to claim 25, further comprising:
an output level setting device detecting the output level, calculating a time average of the detected output level, and setting a target value of the output level in accordance with the calculated time average.

32. An apparatus according to claim 31, wherein the output level setting device interrupts the calculation of the average time when the detected output level is rapidly changed.

33. An apparatus according to claim 25, wherein the selector switches from selecting the gain controller to selecting the output level controller when the output level falls outside a predetermined range.

34. An apparatus according to claim 25, wherein the selector alternately switches back and forth between selecting the gain controller and selecting the output level controller in accordance with a predetermined switching rule, to thereby switch control back and forth between gain control and output level control.

35. An apparatus according to claim 34, wherein, when the gain controller is selected, the selector waits for a first time period before switching from selecting the gain controller to selecting the output level controller, when the output level controller is selected, the selector waits for a second time period before switching from selecting the output level controller to selecting the gain controller, and the first time period is longer than the second time period.

36. An apparatus comprising:

an optical amplifier for amplifying a light; and a controller having a first state in which gain of the optical amplifier is controlled to be constant, and a second state in which an output level of the optical amplifier is controlled to be constant, the controller switching back and forth between the first and second states in accordance with a predetermined switching rule.

37. An apparatus according to claim 36, wherein the controller maintains the first state for a first period of time before switching to the second state, and maintains the second state for a second period of time before switching to the first state, the first period of time being longer than the second period of time.

38. An apparatus according to claim 36, wherein, each time the controller is in the first state, the controller maintains the first state for a first period of time and then switches to the second state, each time the controller is in the second state, the controller maintains the second state for a second period of time and then switches to the first state, and the first period of time is longer than the second period of time.

39. An apparatus according to claim 36, wherein the controller comprises an optical attenuator having a variable attenuation for attenuating the light, the controller controlling the attenuation to cause the output level to be constant when in the second state.

40. An apparatus according to claim 36, wherein the optical amplifier comprises an optical amplifying medium and a pump light source supplying pump light to the optical amplifying medium to amplify the light as the light travels through the optical amplifying medium, and the controller controls the power of the pump light to cause the output level to be constant when in the second state.

41. A method comprising:

amplifying a light with an optical amplifier; and switching back and forth between a first state in which a gain of the optical amplifier is controlled to be constant, and a second state in which an output level of the optical amplifier is controlled to be constant.

42. A method according to claim 41, wherein said switching switches back and forth between the first and second states in accordance with a predetermined rule.

43. A method according to claim 41, further comprising:

when in the first state, maintaining the first state for a first period of time before switching to the second state, when in the second state, maintaining the second state for a second period of time before switching to the first state, and the first period of time is longer than the second period of time.

44. An apparatus comprising:

an optical amplifier amplifying a light; and means for switching back and forth between a first state in which a gain of the optical amplifier is controlled to be constant, and a second state in which an output level of the optical amplifier is controlled to be constant.

45. An optical transmission system comprising:

an optical fiber transmission line; and at least one optical amplifying unit operatively connected along the optical fiber transmission line, said at least one optical amplifying unit each comprising an optical amplifier for amplifying a light traveling through the optical fiber transmission line, and a controller having a first state in which gain of the optical amplifier is controlled to be constant, and a second state in which an output level of the optical amplifier is controlled to be constant, the controller switching back and forth between the first and second states in accordance with a predetermined switching rule.

46. An optical transmission system according to claim 45, wherein, in each optical amplifying unit, the controller maintains the first state for a first period of time before switching to the second state, and maintains the second state for a second period of time before switching to the first state, the first period of time being longer than the second period of time.

47. An optical transmission system according to claim 45, wherein, in each optical amplifying unit, each time the controller is in the first state, the controller maintains the first state for a first period of time and then switches to the second state, each time the controller is in the second state, the controller maintains the second state for a second period of time and then switches to the first state, and the first period of time is longer than the second period of time.

48. An optical transmission system according to claim 45, wherein, in each optical amplifying unit, the controller comprises an optical attenuator having a variable attenuation for attenuating the light, the controller controlling the attenuation to cause the output level to be constant when in the second state.

49. An optical transmission system according to claim 45, wherein, in each optical amplifying unit, the optical amplifier comprises an optical amplifying medium and a pump light source supplying pump light to the optical amplifying medium to amplify the light as the light travels through the optical amplifying medium, and the controller controls the power of the pump light to cause the output level to be constant when in the second state.

* * * * *